(12) United States Patent
Carney et al.

(10) Patent No.: US 9,313,299 B2
(45) Date of Patent: Apr. 12, 2016

(54) CLOUD EDGE APPLIANCES TO EXTEND CLOUD APPLICATIONS TO CUSTOMER PREMISES

(71) Applicant: Verizon Patent and Licensing Inc., Arlington, VA (US)

(72) Inventors: Mark D. Carney, Sterling, VA (US); Jeffrey A Jackson, Coppell, TX (US); Dante J. Pacella, Charles Town, WV (US); Theresa A Menzel, Manassas, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 14/133,544

(22) Filed: Dec. 18, 2013

(65) Prior Publication Data

US 2015/0169419 A1    Jun. 18, 2015

(51) Int. Cl.
  *G06F 11/00*   (2006.01)
  *H04L 29/06*   (2006.01)
  *H04L 29/14*   (2006.01)
  *H04L 29/08*   (2006.01)

(52) U.S. Cl.
  CPC ............ *H04L 69/00* (2013.01); *H04L 67/10* (2013.01); *H04L 69/40* (2013.01); *H04L 67/1097* (2013.01)

(58) Field of Classification Search
  CPC .................................................. G06F 11/2033
  See application file for complete search history.

(56) References Cited

U.S. PATENT DOCUMENTS

| | | | | |
|---|---|---|---|---|
| 8,650,159 B1* | 2/2014 | Zhang | ............... | G06F 17/30156 707/664 |
| 8,849,976 B2* | 9/2014 | Thibeault | .............. | G06F 9/5027 709/223 |
| 8,909,757 B1* | 12/2014 | Yiu | .................... | G06F 17/30899 709/223 |
| 8,935,317 B2* | 1/2015 | Jain | ........................ | G06F 9/5072 709/203 |
| 2010/0332454 A1* | 12/2010 | Prahlad | ............... | G06F 17/3002 707/654 |
| 2012/0131193 A1* | 5/2012 | Ferris | .................... | G06F 9/5072 709/226 |
| 2014/0006843 A1* | 1/2014 | Kim | .................... | G06F 11/2002 714/4.1 |
| 2015/0106511 A1* | 4/2015 | Astigarraga | ............ | H04L 43/16 709/224 |

* cited by examiner

*Primary Examiner* — Christopher McCarthy

(57) ABSTRACT

A cloud edge appliance (CEA) may augment the providing, by a remote cloud service provider, of cloud applications to a customer. The CEA may be installed at the customer premises and may provide a local access point for the customer. In one implementation, the CEA may provide a cloud-based application to a number of user devices, the cloud-based application being associated with functions, in which at least a first portion of the functions are implemented by the CEA and at least a second portion of the plurality of functions are forwarded, over a wide area network, to the cloud service provider.

20 Claims, 10 Drawing Sheets

CLOUD EDGE APPLIANCES TO EXTEND CLOUD APPLICATIONS TO CUSTOMER PREMISES

BACKGROUND

Cloud applications may provide software as a service (SaaS, also called "on-demand software"), in which software and corresponding data may be hosted at one or more remote servers. Common cloud applications may include office and messaging applications, database management applications, accounting applications, customer relationship management (CRM) applications, content management (CM) applications, and other applications. Cloud applications may be attractive to individuals and companies, as using cloud applications allows for the outsourcing of hardware and software support, associated with the cloud applications, to the cloud provider.

DETAILED DESCRIPTION OF PREFERRED EMBODIMENTS

The following detailed description refers to the accompanying drawings. The same reference numbers in different drawings may identify the same or similar elements.

Techniques are described herein in which a cloud edge appliance (CEA) may augment the providing, by a remote cloud service provider, of cloud applications to a customer. The CEA may be installed at the customer premises and may provide a local access point for the customer. The CEA may, for example, store a local copy of a portion of the cloud data of the customer and may locally perform a portion of the functionality of the cloud application. From the point of view of the customer, the CEA device may be an "appliance" device that can be installed at the customer premises and automatically connect and interact with the cloud service provider.

Figure 1:
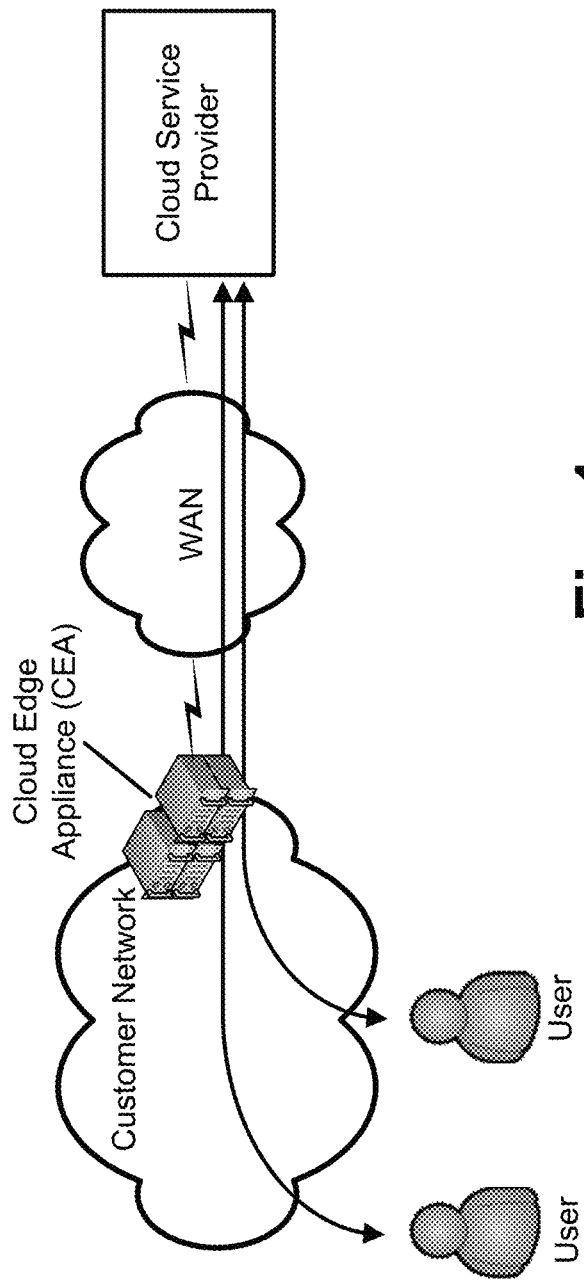
FIG. 1 is a diagram illustrating an overview of concepts described herein.

FIG. 1 is a diagram illustrating an overview of concepts described herein. As illustrated, a customer network may be associated with a number of users. For example, the customer network may be proprietary local area network maintained by a corporation, and the users may be employees of the corporation. A "user," as this term is used herein, may refer to a human user and/or to a computing device (e.g., a smart phone, laptop computer, desktop computer, etc.) that is being used by the human user to access cloud applications. The users may interact with one or more cloud applications (e.g., document processing applications, database applications, customer management applications, email applications, etc.) that are maintained by a cloud service provider (e.g., a third party that hosts the cloud applications). The cloud service provider may connect to the customer network via a wide area network (WAN), such as a public network (e.g., the Internet) or a network provided by one or more telecommunication companies. The corporation, in utilizing the applications provided by the cloud service provider, may be able to efficiently (e.g., cost-effectively) outsource the maintenance and upgrading of the applications and the corresponding computing hardware needed to run the applications.

One potential disadvantage of cloud applications is that, because communications relating to the operation of the cloud applications are passed through the WAN, the cloud applications may be subject to network outages and congestion in the WAN. For example, if the WAN is experiencing unusually high latency, responsiveness of the cloud application to user actions may be slow and may result in a poor user experience. As another example, if network connectivity to the WAN is down (or the WAN itself is down), the cloud applications may be unusable by the users.

Consistent with aspects described herein, as is further illustrated in FIG. 1, a CEA may be installed locally to the customer network. The users, when interacting with the cloud applications, instead of communicating directly with the cloud service provider, may communicate with the cloud service provider via the CEA. The CEA may perform certain operations locally (e.g., at the customer network) and may thus respond to user actions without needing to transmit a request over the WAN. For other operations, the CEA may issue remote requests to the cloud service provider. In this manner, the CEA may perform at least some operations locally and may thus potentially improve the application performance that is experienced by the users. In other words, the CEA may act to mitigate or eliminate the potential disadvantages discussed in the previous paragraph.

In some implementations, the CEA may be configured to intelligently manage network outages associated with the WAN, such as by caching data locally at the CEA and then synchronizing the data with the cloud service provider when network connectivity is restored. In other implementations, multiple CEAs may communicate with one another to mitigate the effect of network outages. For example, multiple CEAs may communicate with one another to form network links that can be used to bypass network outages, such as by connecting to the cloud service provider via a backup or alternate WAN.

Figure 2:
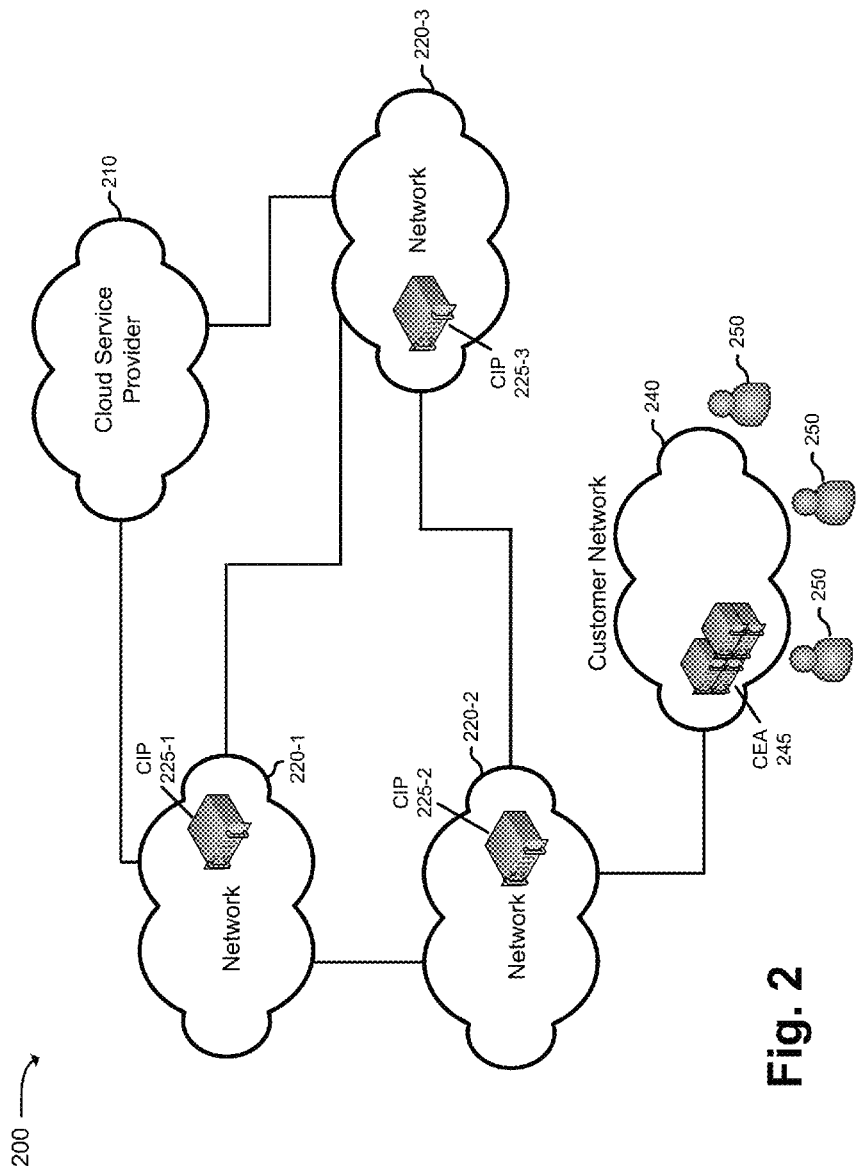
FIG. 2 is a diagram illustrating an example environment in which systems and/or methods described herein may be implemented.

FIG. 2 illustrates an example environment 200 in which systems and/or methods described herein may be implemented. As shown in FIG. 2, environment 200 may include cloud service provider 210, networks 220-1 through 220-3 (referred to collectively as networks 220 and/or individually as network 220), and customer network 240. Customer network 240 may be associated with CEA 245 and one or more users 250.

Cloud service provider 210 may include a number of computing devices configured to provide computing services ("cloud-based applications" or "cloud applications") to an entity associated with customer network 240 (e.g., to a corporation or other entity or to users 250 that are associated with the corporation). Cloud service provider 210 may include, for example, a single computing device, clusters of computing devices (e.g., blades or rack mounted server computers) that are co-located or geographically distributed, or other arrangements of computing devices. The cloud applications that are provided by cloud service provider 210 may generally include any application or service that can be provided to users, such as users 250, over a network. For example, the cloud applications may include messaging applications, database applications, accounting applications, CRM applications, and/or other applications.

Networks 220-1 through 220-3 may each include wired and/or wireless networks that are managed by a network service provider. For example, networks 220-1 through 220-3 may each be managed by a different network service provider (e.g., different telecommunication companies). In some situations, the network service providers that maintain networks 220-1 through 220-3 may have agreements with one another to forward network traffic between networks 220-1 through 220-3. In this situation, from the perspective of cloud service provider 210 and/or customer network 240, networks 220-1 through 220-3 can be viewed as a single connected network. In other situations, a cloud service provider 210 or customer network 240 may contract with network service providers, corresponding to particular networks 220, to carry data. For example, an operator of customer network 240 may contract with network service providers associated with networks 220-2 and 220-3 to carry guaranteed bit rate traffic flows between cloud service provider 210 and customer network 240.

Networks 220-1 through 220-3 may be associated with cloud interconnect points (CIPs) 225-1 through 225-3 (referred to collectively as CIPs 225 and/or individually as CIP 225). Each CIP 225 may include one or more computing devices that may provide routing and/or forwarding services for CEAs 245. CIPs 225 may, for example, coordinate the formation of network paths (e.g., through various networks 220-1 through 220-3) for data communicated between cloud service provider 210 and customer network 240. CIPs 225 may generally act to connect networks provided by different service providers. CIPs 225 may also determine repair or backup paths for data communicated between cloud service provider 210 and customer network 240. For example, assume customer network 240 communicates with cloud service provider 210 via a network path that traverses network 220-2 and network 220-3. Further assume that network 220-3 becomes unavailable. In this situation, CIPs 225-1 and 225-2 may form a backup network path that traverses network 220-2 and network 220-1. In some implementations, CIPs 225 may act as gateways for networks 220.

Customer network 240 may represent a local area network, such as a local area network installed in a physical premises (e.g., an office building) or another structure to provide network connectivity to a one or more users 250. For example, customer network 240 may be a corporate network, university network, home network, or other network that is maintained for the benefit of a defined group of users 250. Users 250 may particularly use cloud applications provided by cloud service provider 210.

CEA 245 may be installed locally at customer network 240. CEA 245 may include a server implemented as one or more computing devices, computing clusters (e.g., blades or rack-mounted server computers), or other arrangements of computing devices. Each CEA 245 may augment the providing of one or more cloud applications, to users 250, that are provided by cloud service provider 210. For example, CEA 245 may include one or more memory devices that store documents, emails, or other files relating to cloud applications. In some implementations, CEA 245 may act as a local storage or cache for files that are associated with users 250. For example, cloud service provider 210 and CEA 245 may maintain a subset of the most frequently accessed files that are associated with users 250. When a user 250 attempts to retrieve one of these files, CEA 245 may directly provide the file to user 250 without having to contact cloud service provider 210. However, when a user attempts to retrieve a file that is not stored locally by CEA 245, CEA 245 may first retrieve the file from cloud service provider 210 before providing the file to user 250.

In addition to storing files, CEA 245 may implement logic relating to the substantive operation of the cloud applications performed by cloud service provider 210. For example, a particular cloud application may include a number of functional units (e.g., functions, methods, programming classes, etc.). CEA 245 may implement some or all of the functional units associated with the particular cloud application. For example, CEA 245 may implement some functions locally for users 250 while other functions may be forwarded, by CEA 245, to cloud service provider 210 for execution. In one implementation, the cloud service provider 210 may provide CEA 245 to customer network 245. In this situation, cloud service provider 210 may control the functionality implemented by CEA 245.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. For example, although one cloud service provider 210, three networks 220, and one customer network 240 are illustrated in FIG. 2, other implementations may include additional or fewer of these elements. The illustrated devices may interconnect via wired connections, wireless connections, or a combination of wired and wireless connections.

Figure 3:
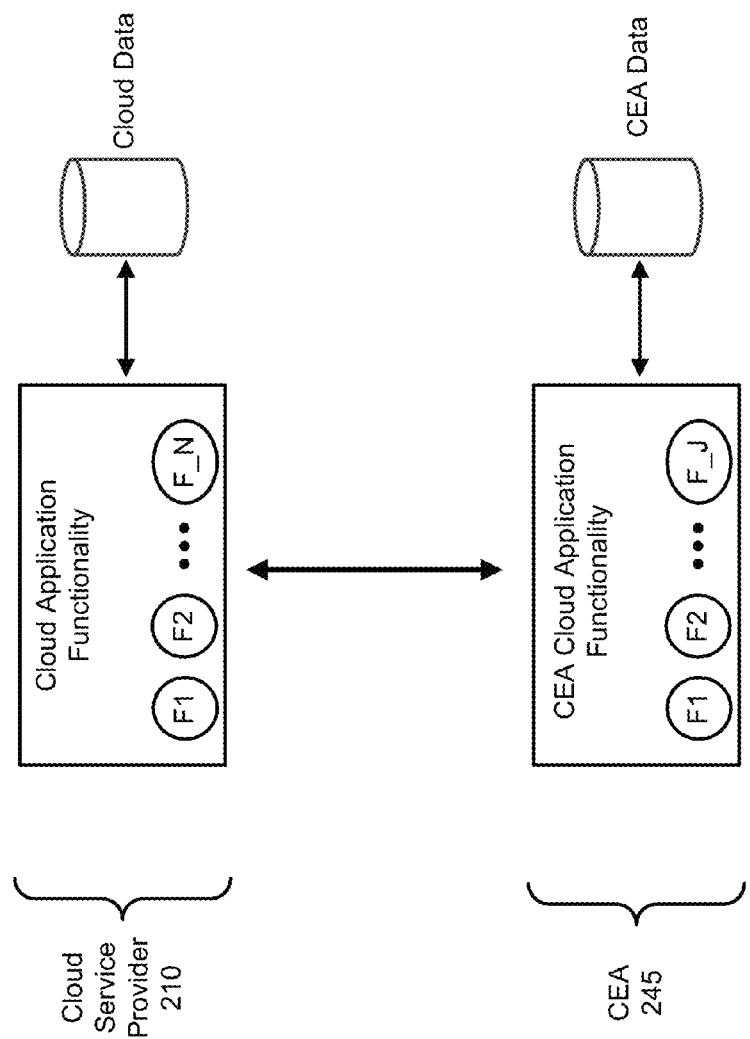
FIG. 3 is a diagram illustrating an example of the operation of a cloud application by a cloud edge appliance (CEA) and a cloud service provider.

As previously mentioned, the specific functionality, implemented by CEA 245, relating to a particular cloud application, may include a subset of the functionality of the full cloud application (e.g., as implemented by cloud service provider 210). FIG. 3 is a diagram illustrating an example of an implementation of a cloud application by CEA 245 and cloud service provider 210.

As illustrated in FIG. 3, a cloud application can be conceptualized as including a number of functions F1, F2, . . . F_N (N>=1). Each function may represent a particular function, method, or other logical division of the functionality of the cloud application. Cloud service provider 210 may host the complete set of functions for the particular cloud application. Similarly, cloud service provider 210 may store data ("cloud data") relating to the operation of the cloud application. CEA 245 may also implement a number of local functions F1, F2, F_J (J>=1) relating to the operation of the cloud application. In one implementation, the functions implement by CEA 245 may be a subset of the complete set of N functions. In this situation, when a local function (F1, F2, . . . F_J) is corresponds to a function that can satisfy a request from a user 250, CEA 245 may use the local function. When a local function is not available, CEA 245 may forward the request to cloud service provider 210. CEA 245 may also store data locally ("CEA data") relating to the operation of the cloud application. As previously mentioned, in some implementations, the locally stored data may act as a cache or temporary storage for the data stored by cloud service provider 210.

In one implementation, the decision as to what functions and/or data are stored at CEA 245 and which are stored at cloud service provider 210 may be made by, for example, administrators or programmers associated with cloud service provider 210. In general, the decision may be based on the desire to increase the responsiveness, from the point of view of users 250, of the cloud application, to optimize network usage, and/or to optimize processing load between CEA 245 and cloud service provider 210. In some implementations, the decision as to what functions and/or data are stored at CEA 245 may be performed automatically based on analysis of the frequency of use of functions or data.

By offloading data storage and processing functionality from cloud service provider 210, CEA 245 may advantageously operate to increase the reliability of the cloud application provided to users 250. As an example, assume that the cloud application includes a hosted email service and a network outage causes customer network 240 to lose all network connectivity external to customer network 240. In this situation, because users 250 may still have access to CEA 245, users 250 may still be able to access their email, such as by viewing previously sent or received emails, creating email drafts, etc. As another example, assume that the network outage causes customer network 240 to lose network connectivity with cloud service provider 210, although general network connectivity to networks 220 is still available. In this situation, CEA 245 may allow users to continue to send and receive email as normal, although certain requests that require functionality and/or data stored by cloud service provider 210 may result in CEA 245 providing an error message to the user. For example, a request to search archived emails or a request to modify certain account settings, which would normally be accomplished via a request to cloud service provider 210, may cause an error message, indicating that the user's action could not be performed, may be displayed to the user.

Figure 4:
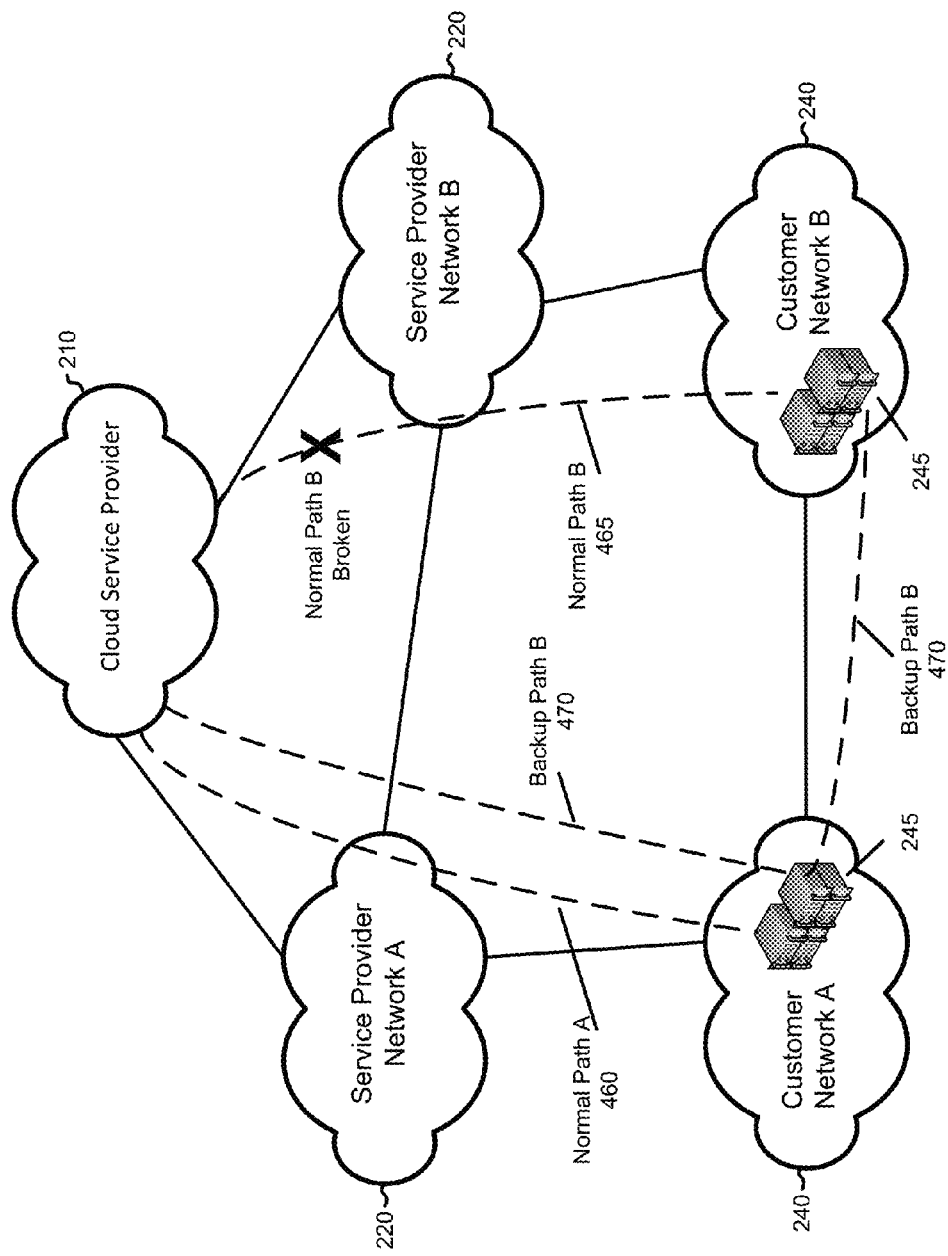
FIGS. 4 and 5 are diagrams illustrating an example of repairing network connections between a customer network and a cloud service provider.

In addition to improving the reliability of the cloud applications, CEAs 245 may operate to actively repair failed network connections relating to network traffic communicated via networks 220. FIG. 4 is a diagram illustrating an example of repairing network connections between customer network 240 and cloud service provider 210.

As illustrated, cloud service provider 210 may provide cloud applications to multiple customer networks 240 (e.g., customer premises), particularly labeled as Customer Network A and Customer Network B in FIG. 4. Each customer network 240 may host a particular CEA 245 to augment cloud applications provided by cloud service provider 210. Network connectivity for the cloud applications may be provided by two networks 220, labeled as Service Provider Network A (which provides a data path between cloud service provider 210 and Customer Network A) and Service Provider Network B (which provides a data path between cloud service provider 210 and Customer Network B). In this example, assume that Customer Networks A and B are operated by the same entity. For example, a corporation may have multiple office locations (e.g., a main office and a satellite office) and each office location may be associated with a customer network 240. Customer Networks A and B may include direct network connectivity between each other.

In FIG. 4, Customer Network A may normally connect to cloud service provider 210 through network path 460 ("Normal Path A"), which may traverse Service Provider Network A. Customer Network B may normally connect to cloud service provider 210 through network path 465 ("Normal Path B"), which may traverse Service Provider Network B. In this example, assume that network path 465 fails (indicated by "X, Normal Path B Broken"). Consistent with aspects described herein, the CEA associated with Customer Network B may detect the failure of network path 465 and, in response, may search for an alternative network path to cloud service provider 210. Searching for the alternative network path may include communicating with other connected CEAs, such as the CEA associated with Customer Network A, to determine if the other CEA(s) are connected to cloud service provider 210.

The CEA in Customer Network B may form a backup network path, illustrated as Backup Path B 470, to cloud service provider 210. Backup Path B 470 may be formed using a different network service provider than the primary network service provider that provides network connectivity to Customer Network B (e.g., Service Provider Network A). The CEA associated with Customer Network A may thus act as a bridge for connecting the CEA associated with Customer Network A with cloud service provider 210. When network path 465 comes back online, the CEA associated with Customer Network A may resume using Service Provider Network B to connect to cloud service provider 210.

As previously mentioned, CIPs 225 may act as interconnection points between networks 220 associated with different service providers. CIPs 225 may provide the backup paths mentioned above, or assist in the providing of the backup paths, in the event of a failure of one of networks 220, in a manner similar to that discussed, with respect to FIG. 4, for CEAs 245.

Figure 5:
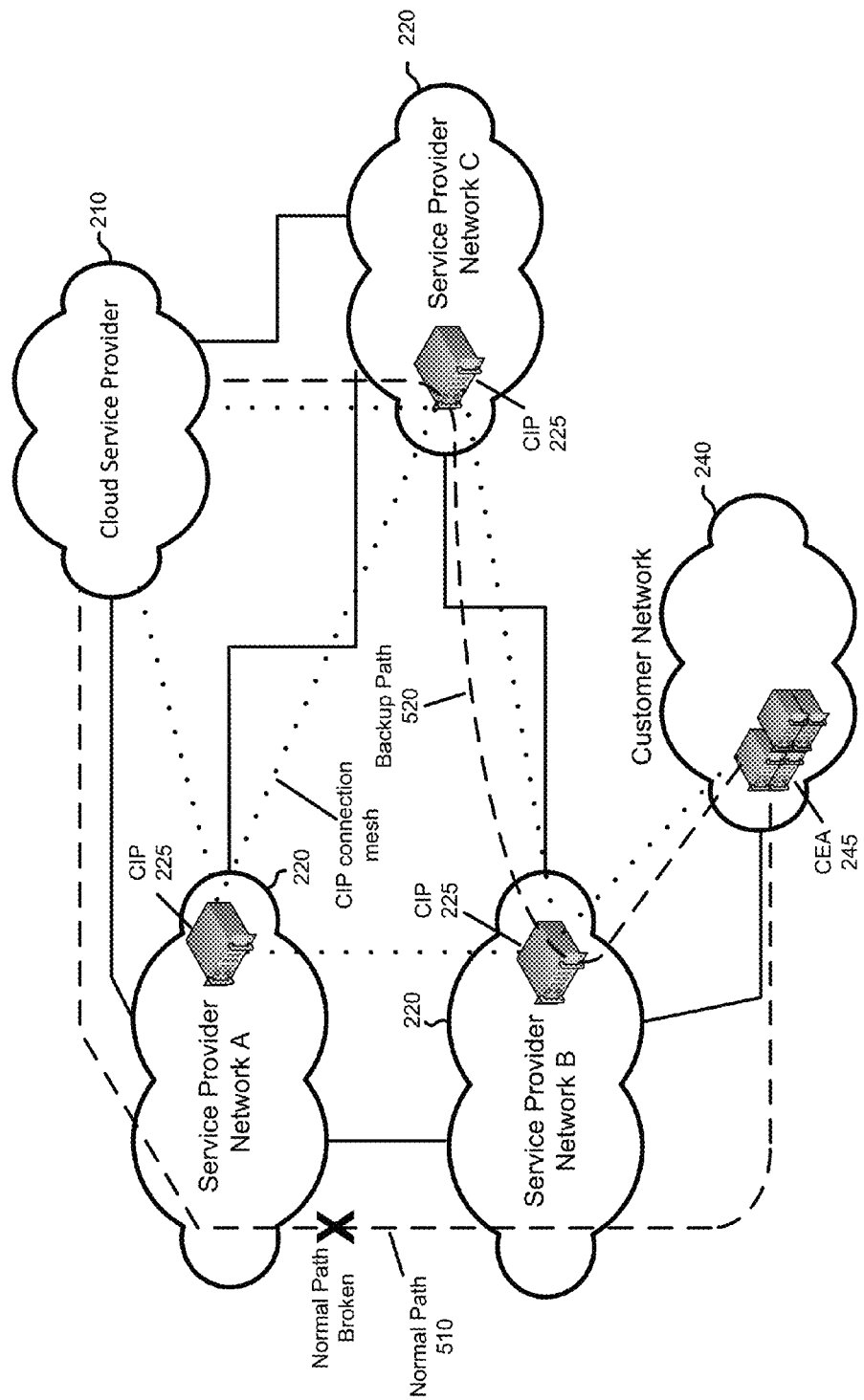

FIG. 5 is a diagram illustrating another example of repairing network connections for a CEA. In this example, backup network paths may be generated using CIPs 225.

As illustrated in FIG. 5, a CIP 225 may be associated with each of three example networks 220, labeled as Service Provider Network A, Service Provider Network B, and Service Provider Network C. The example networks 220 may each be operated by a different operator (service provider). CEA 245, of customer network 240, may connect to cloud service provider 210 through one or more of networks 220.

In one implementation, CIPs 225 may be configured to perform device discovery of one another to create a connection mesh. In FIG. 5, the connection mesh is illustrated by the series of dotted lines labeled "CIP connection mesh."

As is further illustrated in FIG. 5, CEA 245 may connect to cloud service provider 210 through a network path 510 ("Normal Path") that traverses Service Provider Network A and Service Provider Network B. Network path 510 may, at some point, fail. For example, the network of Service Provider Network A may experience a failure (indicated by "X, Normal Path Broken"), such as a failure due to a peering outage or network overload condition. Consistent with aspects described herein, in response to detection of a failed network path, CIPs 225 may operate to implement a backup network path to connect customer network 240 to cloud service provider 210. In one implementation, cloud service provider 210, one of CIPs 225, or CEA 245 may detect the failure of normal path 510 and, in response, may search for an alternative network path to connect cloud service provider 210 with CEA 245. For example, CEA 245 may communicate with all reachable CIPs 225 to determine if any of the reachable CIPs have access to cloud service provider 210. If any reachable CIP 225 has access to cloud service provider 210, the reachable CIP may effectively form a virtual cloud network to handle traffic between CEA 245 and cloud service provider 210. In this example, Backup Path 520, which traverses CIPs 225 of Service Provider Network B and Service Provider Network C, may be determined (e.g., by the CIP associated with Service Provider Network B) as the alternative network path to connect cloud service provider 210 with CEA 245. Backup Path 520 may thus be formed, and CEA 245 may switch to Backup Path 520 when communicating with cloud service provider 210.

In some implementations, in response to a broken network path, CEA 245 may first attempt to establish a backup network path by connecting through other CEAs (e.g., as shown in FIG. 4) and then, if a backup connection through other CEAs is not possible, CEA 245 may attempt to establish a backup network path by connecting through CIPs 225.

Figure 6:
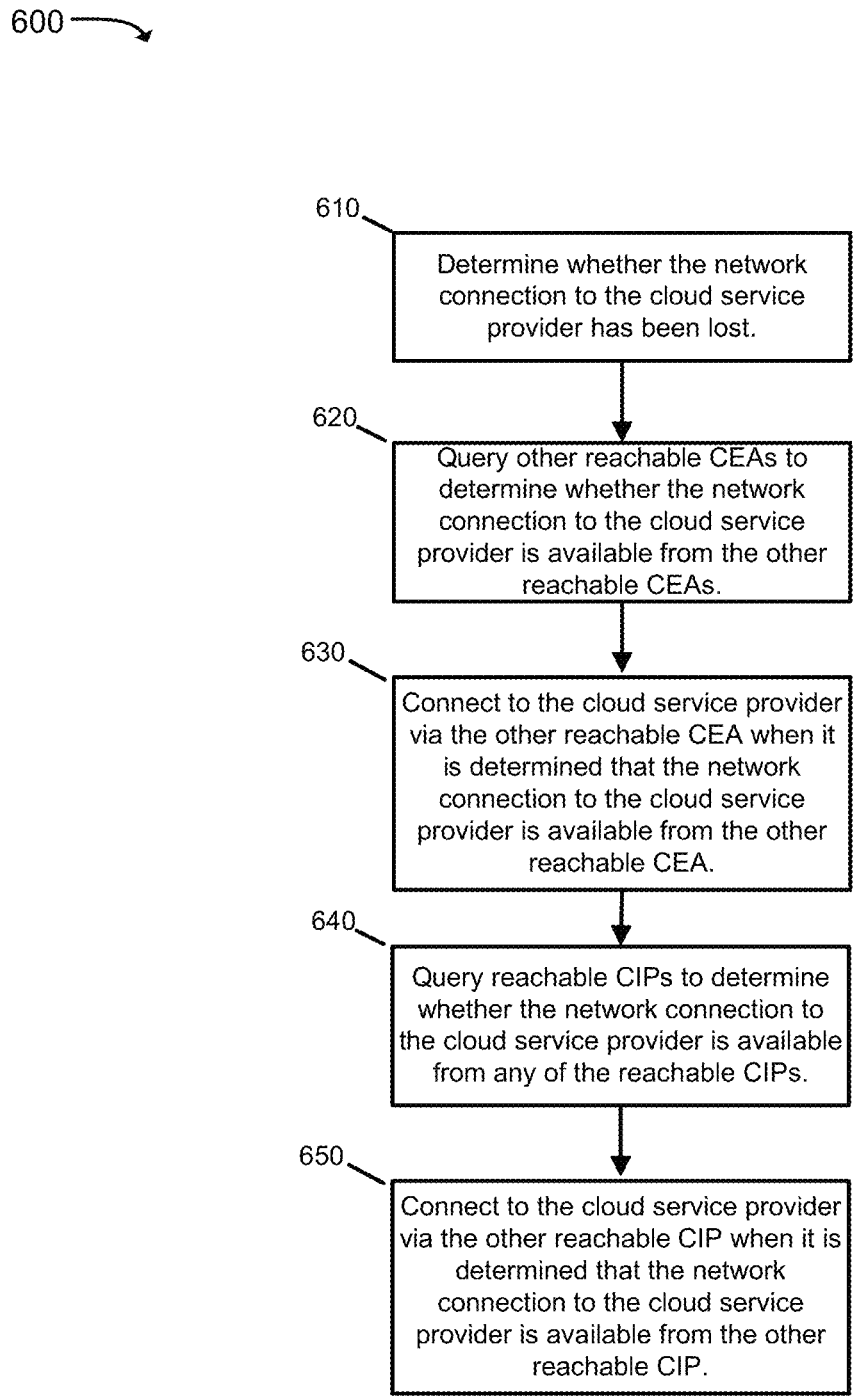
FIG. 6 is a flow chart illustrating an example process relating to the establishment of backup connections between a cloud service provider and a CEA.

FIG. 6 is a flow chart illustrating example process 600 relating to the establishment of backup connections between cloud service provider 210 and CEA 245. Process 600 may be performed by, for example, CEA 245.

Process 600 may include determining whether the network connection to the cloud service provider has been lost (block 610). CEA 245 may, for example, monitor the network connection to cloud service provider 210 to ensure that the network connection is active. When the network connection goes down (e.g., a network connection is not detected for a predetermined time threshold), CEA 245 may determine that the network connection to cloud service provider 210 has been lost and CEA 245 may therefore attempt to establish a network connection to cloud service provider 210 via a backup network path.

Process 600 may further include querying other reachable CEAs to determine whether the network connection to the cloud service provider is available from the other reachable CEAs (block 620). In one implementation, the other reachable CEAs may include CEAs that are part of the same customer network 240 or are part of a different customer network 240 but that are still controlled by a common company or other entity. For example, a corporation may maintain a main office and a satellite office, each of which may correspond to a customer network 240. The main office and the satellite office may be connected by a network connection that is independent of the network connection that is used to connect to cloud service provider 210. Accordingly, a CEA, in the main office, that loses network connectivity to cloud service provider 210, may still be able to access a CEA in the satellite office and determine if the CEA in the satellite office has network connectivity to cloud service provider 210.

Process 600 may further include connecting to the cloud service provider via the other reachable CEA when it is determined that the network connection to the cloud service provider is available from the other reachable CEA (block 630). In one implementation, the other CEA may act as a bridge or proxy device that connects the CEA to cloud service provider 210. For example, as illustrated in FIG. 4, the CEA in Customer Network B may connect to cloud service provider 210 through a backup path that traverses the CEA in customer network A.

Process 600 may further include querying reachable CIPs to determine whether the cloud service provider is available from any of the reachable CIPs (block 640). Blocks 640 and 650 may be performed when CEA 245 is not able to connect to cloud service provider 210 via another reachable CEA (i.e., as attempted in blocks 620 and 630). In one implementation, the other reachable CIPs may include CIPs 225 that are associated with networks 220 that still have network connectivity to CEA 245.

Process 600 may further include connecting to the cloud service provider via the other reachable CIP when it is determined that the network connection to the cloud service provider is available from the other reachable CIP (block 650). For example, as illustrated in FIG. 5, when path 510 (through Service Provider Networks A and B) fails, a backup path to cloud service provider 210 may be obtained through the CIPs associated with Service Provider Network B and Service Provider Network C. In his manner, CEA 245 may be able to discover and use an operable network path to cloud service provider 210.

Figure 7:
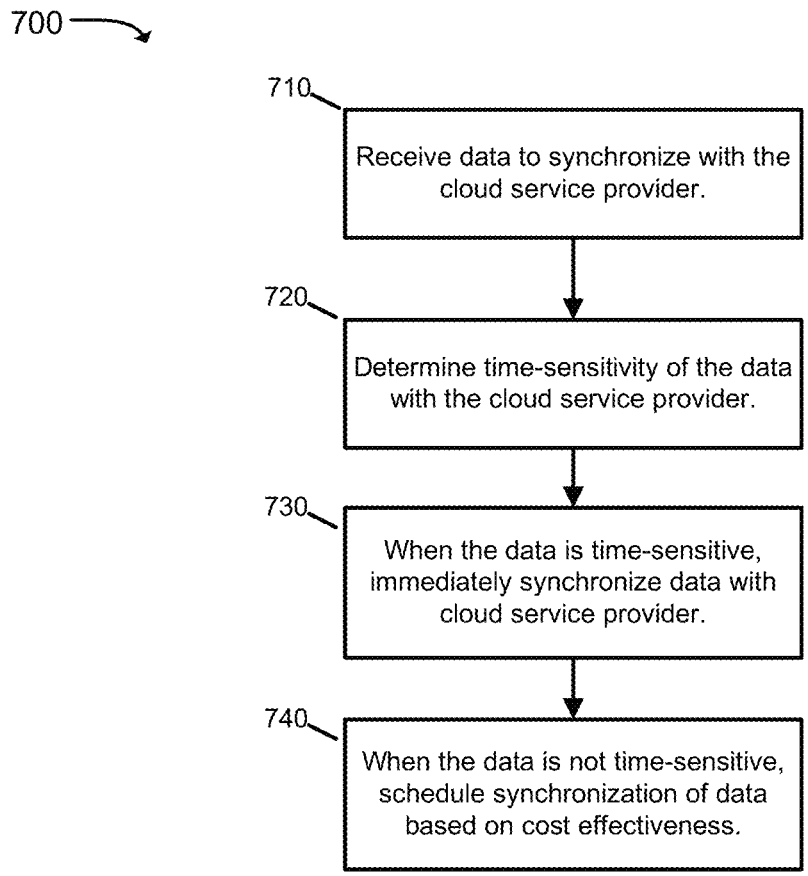
FIG. 7 is a flow chart illustrating an example process for providing network optimization and/or cost optimization functions.

In some implementations, CEA 245 may provide network optimization and/or cost optimization functionality with respect to data transferred over networks 220 and/or the processing load of cloud service provider 210. FIG. 7 is a flow chart illustrating an example process 700 for providing network optimization and/or cost optimization functions. Process 700 may be performed by, for example, CEA 245.

Process 700 may include receiving data to synchronize with the cloud service provider (block 710). The data may include, for example, user documents, user configuration information, files, email data, or other data that may be generated by users 250 as part of the use of a cloud application. As part of the normal operation of the cloud application, the data may be synchronized with cloud service provider 210, which may maintain the master copy of the data.

Process 700 may further include determining the time sensitivity of synchronization of the data with the cloud service provider (block 720). Some data, such as certain documents or other files are likely to be used only by users 250 that are associated with a particular CEA 245, may have a relatively low time sensitivity for synchronization. In other words, these documents or files may be stored by CEA 245 for a period of time without adversely impacting the overall application of the cloud application. Other documents or files may be more time-sensitive. For example, a document that is frequently accessed by users outside of the customer network associated with the particular CEA 245 (e.g., without going through the particular CEA 245), may be more time-sensitive and should be immediately synchronized with cloud service provider 210.

The determination of the time-sensitivity of the data may be performed in a number of ways. For example, administrators may specify the time-sensitivity of data based on predetermined rules. For example, data generated by certain users 250 or data associated with certain cloud applications may always be assumed to be time-sensitive, while data generated for other users 250 or data associated with other cloud applications may always be assumed to not be time-sensitive. As another example, CEA 245 and/or cloud service provider 210 may analyze historical access patterns associated with cloud applications to determine which cloud applications and/or types of data are is time-sensitive. For example, based on analysis of historical access patterns for documents associated with a particular cloud application, CEA 245 and/or cloud service provider 210 may determine that documents generated by a certain group of users are not time-sensitive and documents generated by another group of users are time-sensitive.

Process 700 may further include, when the data is determined to be time-sensitive, immediately synchronizing the data with the cloud service provider (block 730). In this situation, CEA 245 may immediately update cloud service provider 210 to reflect any modifications to documents or other files.

Process 700 may further include, when the data is determined to not be time-sensitive, scheduling synchronization of the data based on cost-effectiveness of the synchronization (block 740). For example, bandwidth over networks 220 may be cheaper at certain times of the day (e.g., at night). As another example, the processing load at cloud service provider 210 may vary throughout the day (e.g., it may be lower at nights and on weekends). CEA 245 may schedule data that is not time-sensitive to be transferred during periods that are more cost-effective or that are associated with lower bandwidth or processing load.

In some implementations, CEA 245, when scheduling data for later synchronization with cloud service provider 210, may immediately transmit a notification to cloud service provider 210 to indicate that particular file or document has been updated and will be later synchronized. In this manner, if the cloud service provider 210 subsequently receives a request for the particular file or document before it has been synchronized, cloud service provider 210 may immediately request the particular file or document from CEA 245.

In some situations, such as for larger customer networks 240, multiple CEAs 245 may be used within a single customer network 240 and the different CEAs 245 may each implement the same set of cloud applications or different CEAs 245 may implement different cloud applications. For example, a particular customer may have five CEA cache-systems (e.g., CEAs that primarily store files) and two CEA application-systems (e.g., CEAs that perform processing logic for cloud applications). In some implementations, instead of CEAs 245 that are implemented as dedicated hardware appliances (such as hardware appliances distributed by cloud service provider 210), CEAs 245 may be provided as software that is installed by the customer.

Figure 8:
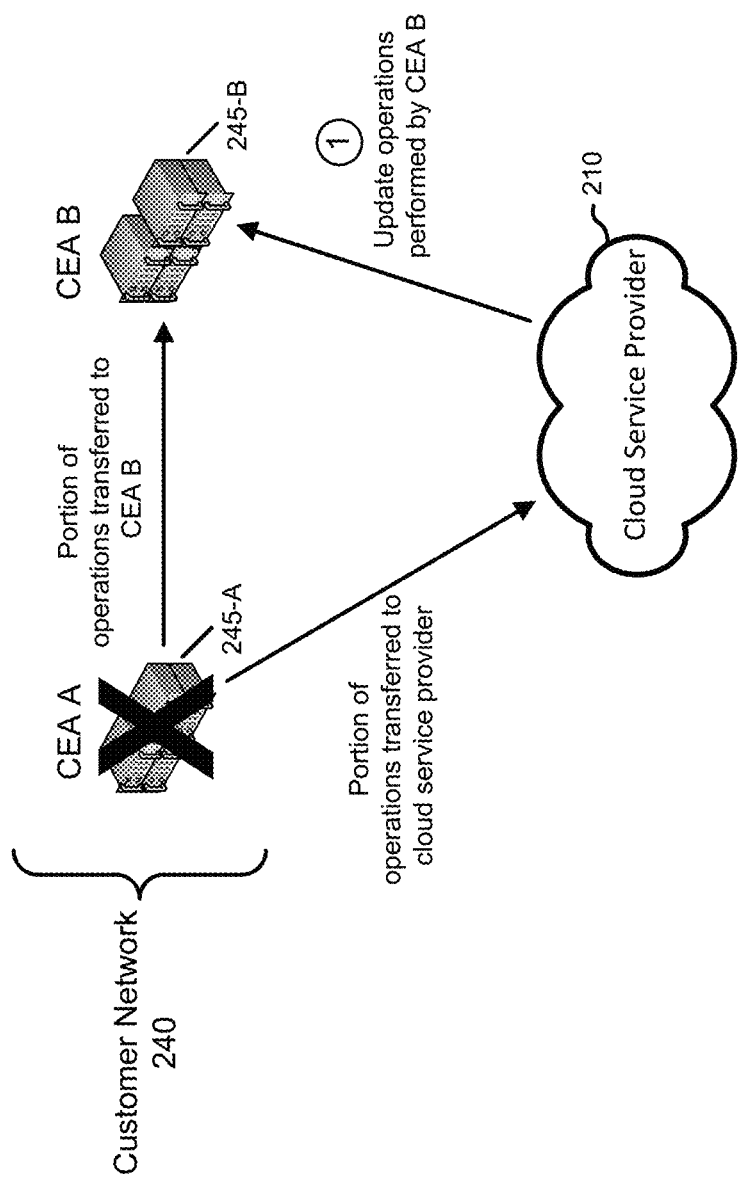
FIG. 8 is a diagram illustrating an example implementation in which multiple CEAs provide redundancy for a customer network.

When multiple CEAs 245 are installed at a single customer network 240, the multiple CEAs 245 operate to provide redundancy to customer network 240. FIG. 8 is a diagram illustrating an example implementation in which multiple CEAs provide redundancy for a customer network 240. As illustrated, two CEAs, labeled as CEA A and CEA B, are installed at a customer network 240 to provide cloud applications in conjunction with cloud service provider 210.

In FIG. 8, assume that CEA A (CEA 245-A) fails (indicted in FIG. 8 by an "X" through CEA A 245-A). CEA B (CEA 245-B) and/or cloud service provider 210 may detect the loss of CEA A 245-A. In one implementation, cloud service provider 210 may direct the redistribution of the services, that were provided by CEA A 245-A, to CEA B 245-B and/or to cloud service provider 210. The redistribution of the services may be based on factors such as the spare processing and/or storage capacity of CEA B 245-B. In this example, assume that it is determined (e.g., by cloud service provider 210) that a portion of the operations that were performed by CEA A 245-A are to be performed by CEA B 245-B and the remaining portion of the operations that were performed by CEA A 245-A are to be performed by cloud service provider 210. For example, cloud service provider 210 may provide an instruction to CEA B 245-B that indicates that CEA B 245-B is to provide cloud application services corresponding to a portion of the services that were previously provided by CEA A 245-A (illustrated as arrow "1," "update operations performed by CEA B"). Users 250 that previously accessed CEA A 245-A for cloud applications may subsequently access CEA B 245-B (e.g., the users may be redirected to CEA B 245-B or CEA B 245-B may be initially provided to users 250 as a backup CEA that is to be accessed when CEA A 245-A is unreachable). Depending on the operations requested by the users, CEA B 245-B may either perform the operation locally or forward the operation to cloud service provider 210 for remote execution.

In the manner described above, in response to the failure of a CEA 245 (e.g., CEA 245-A) at customer network 240, the operations performed by the failed CEA A 245-A may be transferred to another CEA (e.g., CEA 245-B) at customer network 240. In some situations, only a portion of the operations performed by the failed CEA A 245-A may be transferred to the other CEA B 245-B, such that other CEA B 245-B may still function at an appropriate load level.

In some situations, it can be important for CEA 245 to securely store data. For example, it may be desirable to encrypt some or all of the data, when stored locally by CEA 245, associated with users 250. This can be particularly important when the physical device of CEA 245 is located in a space that is not physically secure (e.g., is vulnerable to thefts or tampering).

In one implementation, CEA 245 may be implemented to include one or more sensors designed to detect manipulation of the physical housing of CEA 245. For example, sensors may be used to detect tampering with CEA 245, such as: removal of a hard drive, opening of the case of CEA 245, or movement of CEA 245. In response to the detection of tampering, CEA 245 may take actions to reduce the possibility of data theft.

Figure 9:
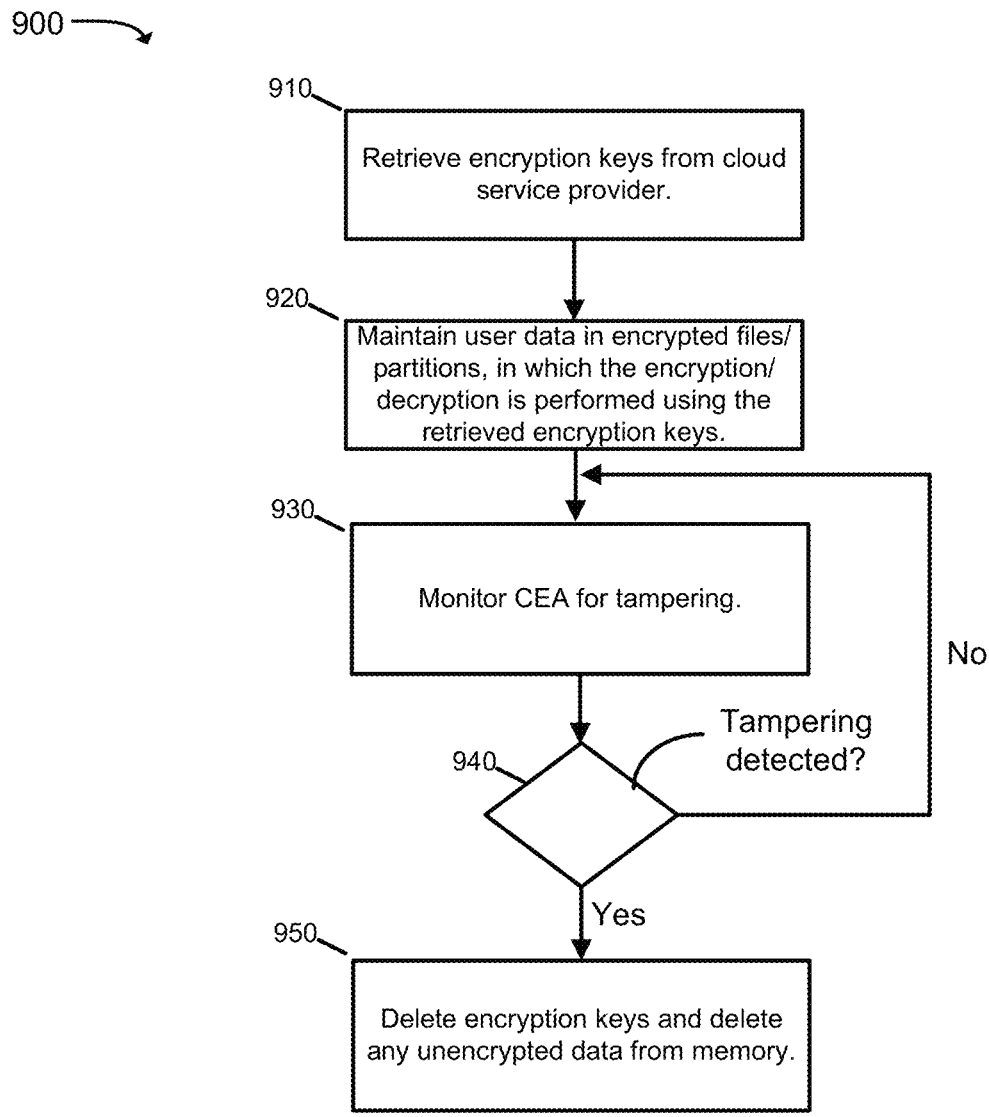
FIG. 9 is a flowchart illustrating an example process for securely storing data by a CEA.

FIG. 9 is a flowchart illustrating an example process 900 for securely storing data by a CEA. In one implementation, process 900 may be performed by CEA 245.

Process 900 may include retrieving encryption keys from the cloud service provider (block 910). The encryption keys may be retrieved, for example, during initial power-up or initialization of CEA 245. The encryption keys may include symmetric encryption keys that may be used to encrypt data stored by CEA 245. For instance, CEA 245 may be configured to encrypt all data that is stored to non-volatile memory (e.g., local hard drives) of CEA 245. Alternatively or additionally, only certain data, such as data associated with certain cloud applications, may be stored in an encrypted manner.

Process 900 may further include maintaining the user data in encrypted files/partitions, in which the encryption/decryption is performed using the retrieved encryption keys (block 920). As mentioned, the encryption/decryption process may be performed for data that is stored to non-volatile memory. In some implementations, the encryption keys may maintained only in volatile memory (e.g., random access memory (RAM)) that is erased when CEA 245 loses power. In this manner, a thief that physically steals CEA 245 may be unable to obtain encryption keys to the stored data.

Process 900 may further include monitoring the CEA for tampering (block 930). As previously mentioned, CEA 245 may include one or more sensors may be used to detect tampering with the physical structure of CEA 245. For example, an attempt to remove the outer case of CEA 245 may result in the generation of a signal that indicates potential tampering.

Process 900 may further include, when tampering is detected, deleting the encryption keys and deleting any unencrypted data stored by CEA 245 (block 940—Yes, and block 950). The encryption keys and unencrypted data may be stored in the volatile (e.g., RAM) memory of CEA 245. Deleting the encryption keys the data may include overwriting the memory locations that store the encryption keys. Alternatively or additionally, deleting the encryption keys may be performed by cutting power to the memory that stores the encryption keys and/or unencrypted data.

Figure 10:
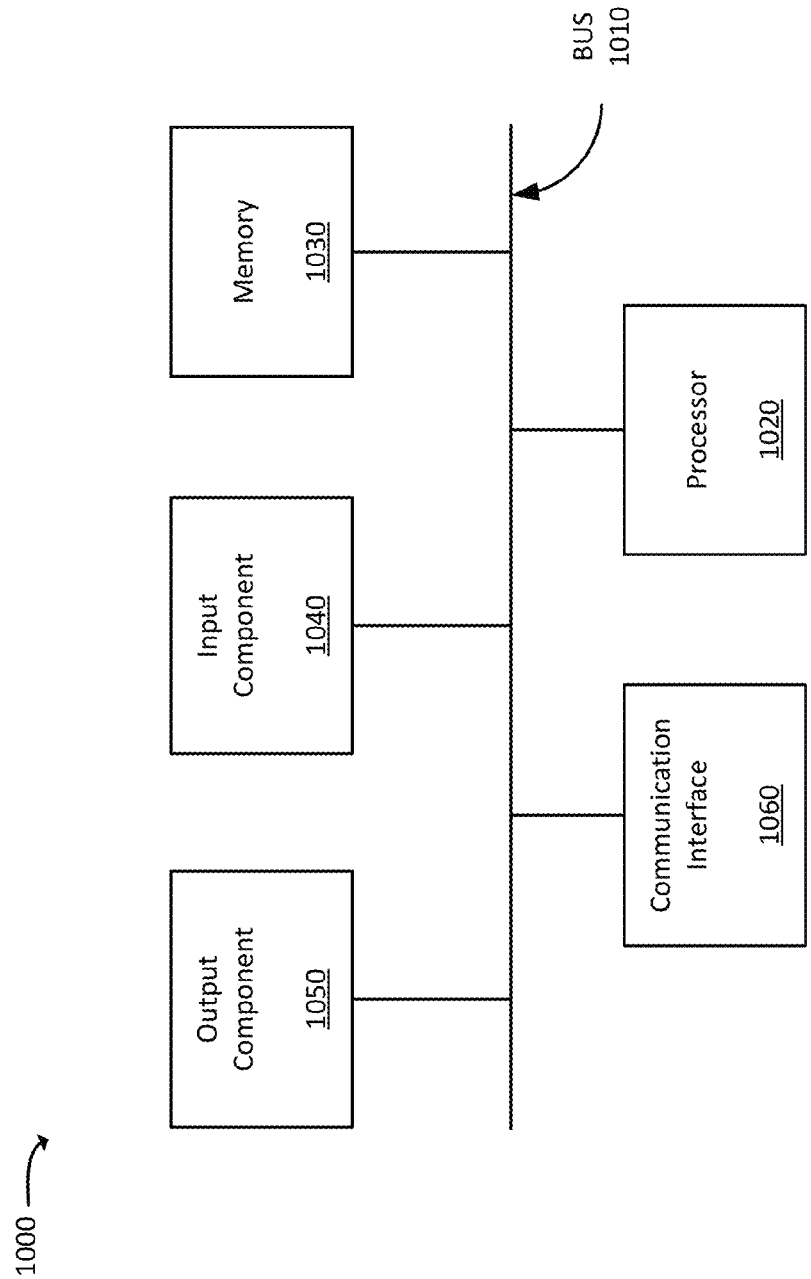
FIG. 10 is a diagram illustrating an example device.

FIG. 10 is a diagram of example components of device 1000. One or more of the devices described above (e.g., as described with respect to FIGS. 1-5 and 8) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, a radio interface, or the like. For example, communication interface 1060 may include a wireless communication device, such as an infrared ("IR") receiver, a Bluetooth radio, a Wi-Fi radio, etc. In some embodiments, device 1000 may include more than one communication interface 1060. For instance, device 1000 may include multiple radio interfaces, an optical interface, and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6, 7, and 9, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the articles "a", "an" and "the" are intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A server device, wherein the server device is a cloud edge appliance (CEA) device, the server device comprising:
   a non-transitory memory device storing a set of computer-executable instructions; and
   a processor configured to execute the set of computer-executable instructions, wherein executing the set of computer-executable instructions causes the processor to:
   provide, over a local network, a cloud-based application to a plurality of user devices, the cloud-based application being associated with a plurality of functions, wherein at least a first portion of the plurality of functions are implemented by the server device and at least a second portion of the plurality of functions are executed by a cloud service provider connected to the server device over a wide area network;
   detect a network outage associated with a connection of the server device to the cloud service provider;
   establish, based on the detection of the network outage, a backup connection of the server device to the cloud service provider;
   query other CEAs, that are reachable by the server device, to determine whether any of the other CEAs are connected to the cloud service provider; and
   establish, when at least one other CEA is determined to be connected to the cloud service provider, the backup connection through the at least one other CEA.

2. The server device of claim 1, wherein the wide area network includes a plurality of service provider networks each associated with a cloud interconnect point (CIP), wherein executing the set of computer-executable instructions to establish the backup connection, further causes the processor to:
   query CIPs that are reachable by the server device to determine whether any of the CIPs can establish a connection to the cloud service provider; and
   establish, when at least one of the CIPs is determined to be connected to the cloud service provider, the backup connection through the at least one CIP.

3. The server device of claim 1, wherein the plurality of functions include functions relating to data storage in which the server device stores files locally for the plurality of user devices.

4. The server device of claim 1, wherein the first portion of the plurality of functions includes a subset of a complete functionality of the cloud-based application.

5. A server device comprising:
   a non-transitory memory device storing a set of computer-executable instructions; and
   a processor configured to execute the set of computer-executable instructions, wherein executing the set of computer-executable instructions causes the processor to:
   provide, over a local network, a cloud-based application to a plurality of user devices, the cloud-based application being associated with a plurality of functions, wherein the plurality of functions include functions relating to data storage in which the server device stores files locally for the plurality of user devices, and wherein at least a first portion of the plurality of functions are implemented by the server device and at least a second portion of the plurality of functions are executed by a cloud service provider connected to the server device over a wide area network;

detect a network outage associated with a connection of the server device to the cloud service provider;

establish, based on the detection of the network outage, a backup connection of the server device to the cloud service provider;

determine whether the files are time-sensitive; and schedule, when the files are determined to not be time-sensitive, the files for later synchronization with the cloud service provider.

6. The server device of claim 5, wherein the plurality of functions include functions relating to data storage in which the server device stores files locally for the plurality of user devices.

7. A server device comprising:

a non-transitory memory device storing a set of computer-executable instructions; and a processor configured to execute the set of computer-executable instructions, wherein executing the set of computer-executable instructions causes the processor to:

provide, over a local network, a cloud-based application to a plurality of user devices, the cloud-based application being associated with a plurality of functions, wherein the plurality of functions include functions relating to data storage in which the server device stores files locally for the plurality of user devices, and wherein at least a first portion of the plurality of functions are implemented by the server device and at least a second portion of the plurality of functions are executed by a cloud service provider connected to the server device over a wide area network;

detect a network outage associated with a connection of the server device to the cloud service provider;

establish, based on the detection of the network outage, a backup connection of the server device to the cloud service provider;

obtain, from the cloud service provider, encryption keys;

store the encryption keys in volatile memory;

store, based on the encryption keys, the files in an encrypted format;

detect tampering with a physical housing of the server; and delete the encryption keys based on detecting the tampering.

8. The server device of claim 7, wherein executing the set of computer-executable instructions further causes, when deleting the encryption keys, the processor to:

cut power to the volatile memory in which the encryption keys are stored.

9. The server device of claim 7, wherein the plurality of functions include functions relating to data storage in which the server device stores files locally for the plurality of user devices.

10. A method, implemented by a server, wherein the server is a cloud edge appliance (CEA) device, the method comprising:

providing, by the server and over a local network, a cloud-based application to a plurality of user devices, the cloud-based application being associated with a plurality of functions, wherein at least a first portion of the plurality of functions are implemented by the server device and at least a second portion of the plurality of functions are executed by a cloud service provider that is connected to the server over a wide area network;

detecting, by the server, a network outage associated with a connection of the server device to the cloud service provider;

establishing, by the server and based on the detection of the network outage, a backup connection of the server device to the cloud service provider;

querying, by the server, other CEAs, that are reachable by the server device, to determine whether any of the other CEAs are connected to the cloud service provider; and establishing, by the server and when at least one other CEA is determined to be connected to the cloud service provider, the backup connection through the at least one other CEA.

11. The method of claim 10, wherein the wide area network includes a plurality of service provider networks each associated with a cloud interconnect point (CIP), and wherein the method further comprises:

querying CIPs that are reachable by the server device to determine whether any of the CIPs can establish a connection to the cloud service provider; and establishing, when at least one of the CIPs is determined to be connected to the cloud service provider, the backup connection through the at least one CIP.

12. The method of claim 10, wherein the plurality of functions include functions relating to data storage in which the server device stores files locally for the plurality of user devices.

13. The method of claim 10, wherein the first portion of the plurality of functions includes a subset of a complete functionality of the cloud-based application.

14. A method, implemented by a server, comprising:

providing, by the server and over a local network, a cloud-based application to a plurality of user devices, the cloud-based application being associated with a plurality of functions, wherein the plurality of functions include functions relating to data storage in which the server device stores files locally for the plurality of user devices, and wherein at least a first portion of the plurality of functions are implemented by the server device and at least a second portion of the plurality of functions are executed by a cloud service provider that is connected to the server over a wide area network;

detecting, by the server, a network outage associated with a connection of the server device to the cloud service provider;

establishing, by the server and based on the detection of the network outage, a backup connection of the server device to the cloud service provider;

determining, by the server, whether the files are time-sensitive; and scheduling, by the server and when the files are determined to not be time-sensitive, the files for later synchronization with the cloud service provider.

15. The method of claim 14, further comprising:

obtaining, from the cloud service provider, encryption keys;

storing the encryption keys in volatile memory;

storing, based on the encryption keys, the files in an encrypted format;

detecting tampering with a physical housing of the server; and deleting the encryption keys based on detecting the tampering.

16. The method of claim 15, wherein deleting the encryption keys further comprises:
cutting power to the volatile memory in which the encryption keys are stored.

17. A system comprising:
a cloud edge appliance (CEA) to execute functionality for a cloud-based application, the CEA providing the at least one cloud-based application to a plurality of user devices that are connected to the CEA over a local area network, the CEA being configured to:
cache data, corresponding to the plurality of user devices,
transmit a copy of the cached data to a cloud service provider, connected to the CEA over a network path that traverses a wide area network, to synchronize the cached data with the cloud service provider,
request, from the cloud service provider, execution, on behalf of the plurality of the user devices, a first portion of the functionality of the cloud-based application, and
execute, on behalf of the plurality of the user devices, a second portion of the functionality of the cloud-based application; and
a plurality of cloud interconnect points (CIPs) to coordinate the formation of the network path over the wide area network, wherein each CIP is associated with a network of a particular network service provider the plurality of CIPs communicating with one another to connect the networks of the network service providers.

18. The system of claim 17, wherein the first portion of the functionality of the cloud-based application includes a subset of a complete functionality of the cloud-based application.

19. A system comprising:
a cloud edge appliance (CEA) to execute functionality for a cloud-based application, the CEA providing the at least one cloud-based application to a plurality of user devices that are connected to the CEA over a local area network, the CEA being configured to:
cache data, corresponding to the plurality of user devices,
transmit a copy of the cached data to a cloud service provider, connected to the CEA over a network path that traverses a wide area network, to synchronize the cached data with the cloud service provider,
request, from the cloud service provider, execution, on behalf of the plurality of the user devices, a first portion of the functionality of the cloud-based application, and
execute, on behalf of the plurality of the user devices, a second portion of the functionality of the cloud-based application; and
a cloud interconnect point (CIP) to coordinate the formation of the network path over the wide area network;
wherein the CEA is further to, when transmitting the copy of the cached data to a cloud service provider:
determine whether the cached data is time-sensitive; and
schedule, when the cached data is determined to not be time-sensitive, the cached data for later synchronization with the cloud service provider.

20. The system of claim 19, wherein the first portion of the functionality of the cloud-based application includes a subset of a complete functionality of the cloud-based application.

* * * * *